(12) United States Patent
Earp

(10) Patent No.: US 7,753,090 B2
(45) Date of Patent: Jul. 13, 2010

(54) BLASTING FLUID EFFLUENT CONTAINMENT DEVICE

(76) Inventor: Danny Earp, 5033 Greenvally Dr., LaPorte, TX (US) 77571

(*) Notice: Subject to any disclaimer, the term of this patent is extended or adjusted under 35 U.S.C. 154(b) by 297 days.

(21) Appl. No.: 11/550,396

(22) Filed: Oct. 17, 2006

(65) Prior Publication Data

US 2007/0199594 A1     Aug. 30, 2007

Related U.S. Application Data

(60) Provisional application No. 60/727,783, filed on Oct. 18, 2005.

(51) Int. Cl.
*B65B 1/04* (2006.01)
*E03B 3/00* (2006.01)

(52) U.S. Cl. ............... 141/86; 141/1; 141/91; 137/15.09

(58) Field of Classification Search ......... 141/1, 141/10, 85–92, 114, 325, 326; 137/312, 137/15.09; 210/167.01
See application file for complete search history.

(56) References Cited

U.S. PATENT DOCUMENTS

| | | | |
|---|---|---|---|
| 3,148,699 A * | 9/1964 | Shindler | 137/312 |
| 3,263,653 A * | 8/1966 | Miller | 119/673 |
| 3,310,322 A * | 3/1967 | Carroll | 285/18 |
| 3,419,151 A | 12/1968 | Smith et al. | |
| 4,207,918 A * | 6/1980 | Burns et al. | 137/375 |
| 4,492,186 A | 1/1985 | Helm | |
| 4,683,067 A | 7/1987 | Aleman et al. | |
| 4,712,270 A * | 12/1987 | Palmer | 15/345 |
| 4,820,000 A * | 4/1989 | Jacobson | 312/1 |
| 4,883,329 A | 11/1989 | Flannery et al. | |
| 4,905,900 A | 3/1990 | Scharton et al. | |
| 4,950,392 A | 8/1990 | Tiegs et al. | |
| 4,963,175 A * | 10/1990 | Pace | 62/372 |
| 5,379,810 A * | 1/1995 | Marino | 141/10 |
| 5,725,009 A | 3/1998 | Mallow, Sr. et al. | |
| 6,164,345 A * | 12/2000 | Haddox | 141/86 |
| 6,244,290 B1 * | 6/2001 | Reicin et al. | 137/312 |
| 6,640,825 B2 * | 11/2003 | McAtarian | 137/312 |

* cited by examiner

*Primary Examiner*—Timothy L Maust
(74) *Attorney, Agent, or Firm*—Baker & Hostetler LLP

(57) ABSTRACT

A device is disclosed which acts to contain the contaminated effluent of an operation such as a hydro-blasting operation. The device has flexible bag for containing the effluent. The bag has an opening interfacing with a vessel being fluid blasted, into which opening the blasting effluent is received. A drain port is positioned on the containment bag to gravity empty the effluent from the interior of the bag, and a vent appropriately located on the containment bag to relieve pressure in the interior space during use and emptying. A flange strap disposed secures the bag opening to the vessel, and a support means is arranged to suspend the containment bag in proper relationship with the vessel. An expansion mechanism can be used to hold the containment bag in an expanded condition to facilitate use of the bag to properly contain the effluent.

19 Claims, 3 Drawing Sheets

BLASTING FLUID EFFLUENT CONTAINMENT DEVICE

The present application claims the benefit of prior filed U.S. Provisional Patent Application, Ser. No. 60/727,783 filed 18 Oct. 2005, to which the present application is a regular U.S. national application.

FIELD OF THE INVENTION

The present invention is in the field of apparatuses for cleaning via fluid contact with solids to remove adherent foreign matter from the internal surfaces of hollow work. More specifically, the present invention relates to a transportable device for collecting the effluent from the treatment of conduits with pressurized fluids.

BACKGROUND OF THE INVENTION

In the petrochemical plant industry, it is regularly necessary to clean various conduits and vessels to remove any accumulating buildup on their interior surfaces. This buildup can comprise constituents of the content of the conduit in addition to foreign matter depositing onto interior surfaces. To clean contaminated conduits and vessels often requires shutting down the associated production line and at least partial disassembly of the conduit or vessel being cleaned. A typical cleaning method is to use a pressurized and heated fluid stream to dissolve or dislodge the accumulation from the solid interior surfaces of the vessel. Hydro-blasting is one such typical pressurized fluid stream cleaning method where the vessel (e.g., a heat exchanger) is opened at both ends and the interior is hydro-blasted from one open end while the fluid effluent, usually still under some pressure, emerges from the other open end. However, because the liquid effluent can be contaminated with toxic materials, the effluent from the operation must be collected and properly disposed of as a toxic waste stream. Often it is not possible to contain the effluent at the location of the vessel, and the vessel must be disassembled further and the internal components moved to another more appropriate site to perform the hydro-blasting operation. This additional disassembly and removal of vessel components increases down time and cost of the cleaning operation. It would be useful in the field to have a means to reduce the number of situations in which it is necessary to disassemble the vessel being serviced to remove the components to be cleaned.

The industry has long recognized aspects of this problem and has been motivated to find solutions to them. For example, Tiegs et al. (U.S. Pat. No. 4,950,392) disclose an apparatus for removing contaminates from a caustic washing solution. The device of the Tiegs et al. patent comprises a filtration tank housing a pump. The pump has a filter bag disposed on its outflow which collects particulates. However, the Tiegs et al. device does not collect all of the effluent, only the particulates. Also, the Tiegs device cannot be used in place, for example, on the opening of a refinery heat exchanger vessel. Additionally, the Tiegs device requires a pump. As another example, Mallow, Sr. et al. (U.S. Pat. No. 5,725,009) disclose a device for containing and redirecting fluid from a down-fitting on a section of a pipe. The device of the Mallow, Sr. et al. comprises a bag with an opening in its top for attaching to the down-fitting of a pipe. After placement over the down-fitting, the cover to the fitting is removed. When the Mallow, Sr. et al. device is practiced, the bag is vertically suspended from the fitting. However, the Mallow, Sr. device cannot be used in a horizontally to attach to an end fitting or an inline fitting. Therefore, it would be further useful in the field to have a device that can collect all of the effluent, and that can be used in place on a vessel or pipe end fitting or inline fitting.

SUMMARY OF THE INVENTION

The present invention is a device for containing the outflow of waste material from a vessel, the interior of which vessel is being cleaned using a hydro-blasting or similar pressurized fluid jet process. More specifically, the present device is useful to contain the effluent of such process that otherwise would be discharged into the environment as a pollutant. Examples of such vessels anticipated by the present invention include heat exchangers and pipe conduits used in petrolchemical refineries.

The present fluid blasting effluent containment device mounts horizontally inline with a vessel's end fitting or inline fitting. The present invention is useful to contain the contaminated effluent of an operation such as a hydro-blasting operation. Containment as anticipated by the present invention means direct streams of liquid, as well as liquid splash and aerosol. The device has a flexible containment bag for receiving and holding the liquid effluent of a fluid blasting operation. The containment bag has an opening interfacing with the vessel being fluid blasted, into which opening the blasting effluent is received. A drain port is positioned on the containment bag so that the contents can be gravity emptied from the interior of the bag. The present invention is a passive device, and requires no mechanization to accomplish its purpose.

A vent is appropriately located on the containment bag to relieve pressure in the interior space during filling, and emptying. The vent can include an aerosol or vapor collector, to prevent or reduce the escape of vapors during collection of the effluent. A flange strap disposed proximate the bag opening is used to seal and secure the bag opening to the vessel, and a support means is arranged to hold or suspend the containment bag in proper relationship with the vessel. An expansion mechanism can be used to hold the containment bag in an expanded condition to facilitate use of the bag to properly contain the effluent.

DETAILED DESCRIPTION OF THE INVENTION

Figure 1:
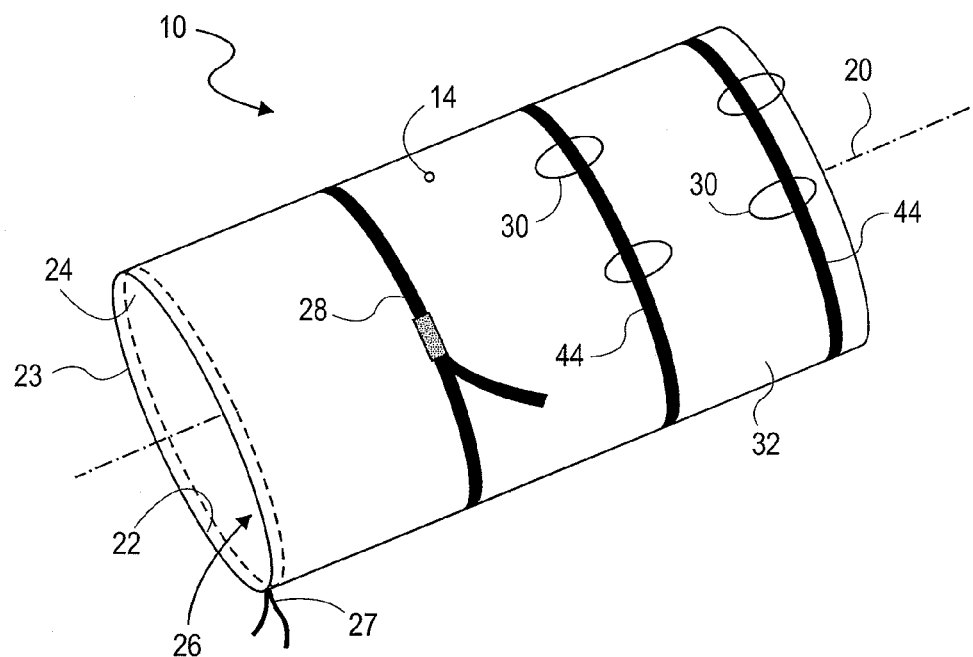
FIG. 1 is a perspective view of a representation of the present fluid blasting effluent containment device of the present invention.

Referring now to the drawings, the details of preferred embodiments of the present invention are graphically and schematically illustrated. Like elements in the drawings are represented by like numbers, and any similar elements are represented by like numbers with a different lower case letter suffix.

Figure 2A:
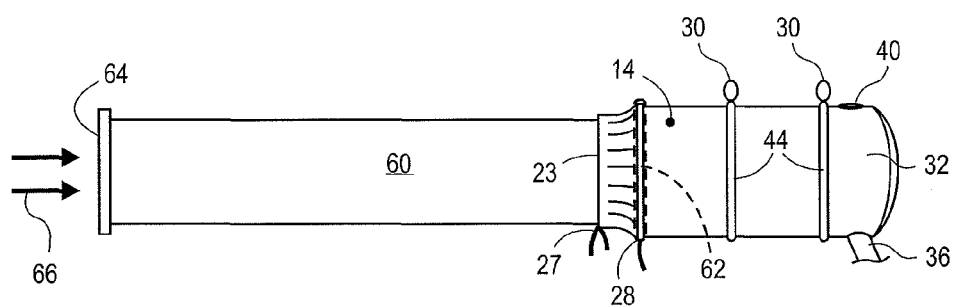
FIG. 2A is a side elevation view representation of the present blast containment device installed on a heat exchanger type vessel at its end fitting, and its horizontal configuration.
Figure 2B:
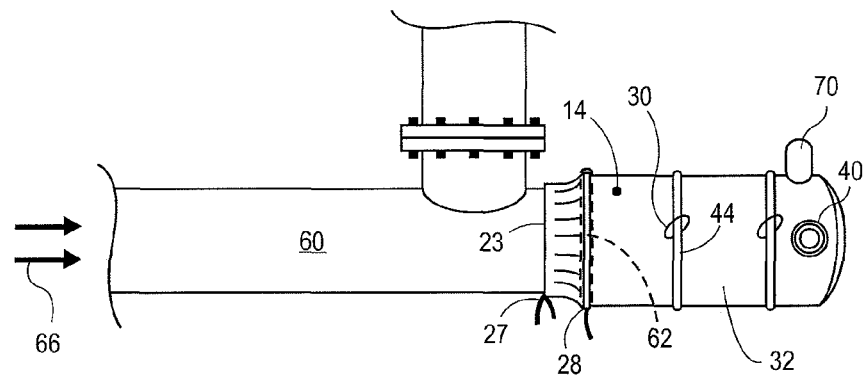
FIG. 2B is a top plan view of a representation of the present blast containment device installed on a heat exchanger type vessel at an "inline" type end fitting.

As illustrated in FIGS. 1, 2A and 2B, the present blasting fluid effluent containment device 10 comprises a flexible containment bag 14 having support attachment points 30 for suspending the bag in place at one open end 62 of a vessel 60 being fluid blasted. The containment bag 14 has a bag opening 22 for interfacing with the open back end 62 of the vessel 60 opposite the operations or front end 64 of the vessel 60 where the fluid jet 66 is being introduced into the vessel 60 (see FIG. 2). A flange strap 28 is disposed proximate the bag opening 22. The flange strap 28 provides a means to securely cinch bag 14 against the very end of the vessel 60 being fluid blasted to secure the bag opening 22 of the containment bag 14 to the vessel 60. The throat portion 24 of the bag opening 22 is drawn closed at it leading edge 23 around the circumference of the vessel 60. This traps any leakage and provides added security should the flange strap 28 slip. A benefit of the horizontal aspect of the present invention is that the full cross-section of the fitting in line with the flow of the vessel is open directly to the interior of the bag 14, and back pressure that otherwise may be present is reduced.

The attachment points 30 are disposed on the exterior wall 32 of the containment bag 14 to provide a mechanism to connect a means (not shown) of suspending the containment bag 14 to have the bag opening 22 in a proper relationship with the open end 62 of the vessel 60, as illustrated in FIG. 2. The proper relationship allows the effluent flowing from the open back end 62 of the vessel, whether as a fluid stream or as a vapor cloud, to pass through the bag opening 22 and be collected and contained in the interior space 26 of the bag 14. Additionally, as shown in the figures, an expansion means 44 is provided to hold the containment bag 14 in an expanded condition to facilitate collecting the effluent in the interior space 26 of the bag 14.

Effluent collected in the interior space 26 of the containment bag 14 is drained from the bag 14 via a drain port 36 disposed in the bag wall 32 proximate the bottom of the interior space 26. A vent 40 is also provided, and is disposed in the bag wall 32 proximate the top of the interior space 26. The vent 40 relieves any pressure positive or negative) buildup that may tend to accumulate in the interior space 26 of the bag 14. Because the interior space is intended to be proximately at atmospheric pressure, an expansion means 44 is provided to hold the containment bag 14 in an expanded condition during use. This additionally helps to minimize back pressure that otherwise may be present.

In a preferred embodiment as illustrated in the figures, the bag 14 of the present blasting fluid effluent containment device 10 is made of a flexible material and is water impermeable. Preferably, the containment bag 14 is made of a flexible, reinforced, rubberized material. The material should be proof against the expected composition of the effluent it is intended to contain. For example, a neoprene coated reinforced fabric is readily available and useful for many applications of the present device 10. Other suitable bag materials are known to and are selectable by one of ordinary skill in the art for practice in the present invention.

Figure 3:
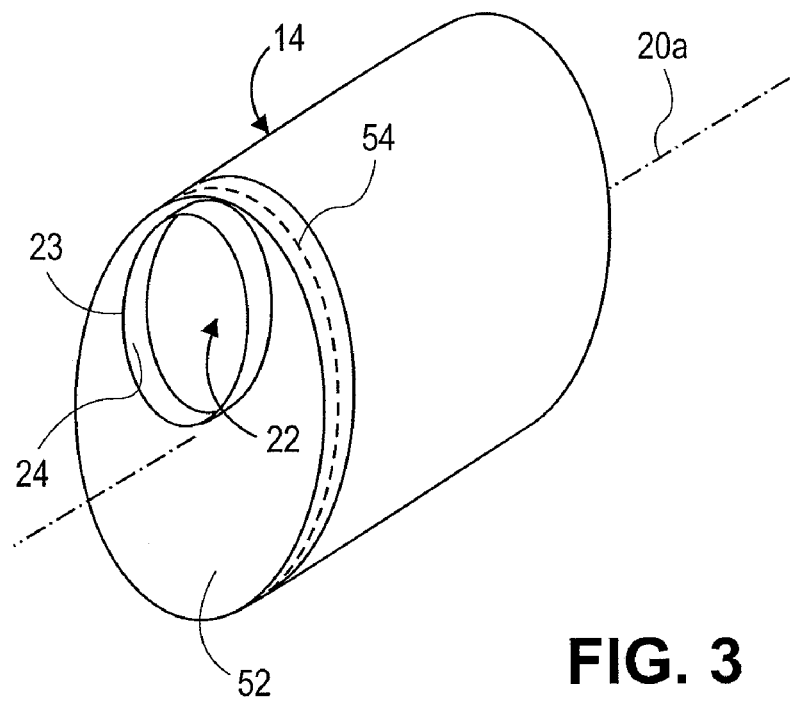
FIG. 3 is a perspective view of a representation of the present fluid blasting effluent containment device showing an opening in the bag of the device which is smaller than the cross-section of the interior space of the bag.
Figure 4:
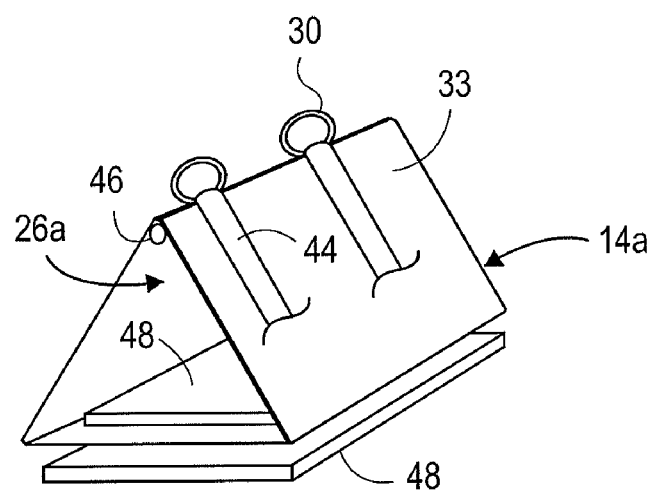
FIG. 4 is a perspective view of an alternative cross-sectional configuration of the interior space of the bag of the present containment device.

In the preferred embodiment illustrated in FIGS. 1-3, the containment bag 14 is substantially cylindrical and mounted horizontally along its axis, in line with the open end 62 of the vessel 60. Although the containment bag 14 is exemplified with the interior space 26 as having a substantially circular cross-section, other cross-sectional configurations of the interior space 26 are practicable in the containment device as well. For example, FIG. 4 illustrates an alternative embodiment of the present containment device wherein the interior space 26a of the bag 14a has a substantially triangular cross-section. Additionally illustrated in FIG. 4 is a expansion plate 48, which is used to hold the interior space 26a of the containment bag 14a in an expanded condition. A expansion plate 48 may be disposed on the inside of the bag 14a in the interior space 26a, on the exterior wall 33 of the bag 14a, or both. It is an intended feature of whatever expansion means is utilized in practicing the present device 10, that it not prevent the containment bag 14 from being collapsible to facilitate its storage. A support rod 46 may be used either inside or outside a containment bag 14a to facilitate supporting the bag 14a along a length parallel to its axis 20. Once effluent is collected in the containment bag 14, it is removed via the drain port 36. In the preferred embodiments illustrated, a gravity drain was used to drain the blasting effluent from the interior space 26 of the containment bag. That is, the drain port 36 was disposed on the containment bag 14 to gravity empty the effluent from the bag's interior space 26, as opposed to using an active or driven emptying means (e.g., a pump).

The vent 40 is disposed on the containment bag 14 to relieve any pressure that may develop in the interior space 26 of the bag 14 during use. Because the pressure condition of the effluent as it exits the back end opening 62 of the vessel 60 can be variable (i.e., passive flow, driven flow, pressurized stream, vapor cloud), absent a venting mechanism positive pressure may develop in the bag's interior space 26 and cause a back pressure on the effluent. The vent 40 is intended to alleviate this. Additionally, it is possible in certain circumstances that the draining process could create a negative pressure in the bag, causing the walls of the containment bag to collapse and reducing the empty volume of the interior space 26. The vent 40 is also intended to alleviate this condition if it is a problem. Because there is the likelihood the effluent will comprise a vapor component, it is preferred that the vent 40 include a vapor trap (not shown) to reduce or eliminate emission of contaminated and/or hazardous chemical vapors from the device 10. Vapor traps are know to and selectable by one of ordinary skill in the art for practice in the present invention. Examples of such traps include absorption traps make of porous meshes, fibers and other high surface area materials disposed between the interior of the bag and atmosphere, to provide a collection surface for the vapors. Optionally, the vent 40 may be configured to be closeable.

As exemplified in FIG. 3, bag opening 22 of the present fluid blasting effluent containment device 10 does not have to comprise the entire cross-section of the interior space 26 of the bag 14. In FIG. 3, the bag opening 22 is smaller than the cross-section of the interior space 26 of the bag 14, but the plane of the bag opening 22 is still substantially perpendicular to the horizontal axis 20a of the bag 14. Also, as illustrated in FIG. 3, the containment bag front 52 may be separable from the rest of the containment bag 14, and attachable by such means as a zipper 54. A removable bag front 52 allows use of different sized bag opening 22 to be used in the same containment device 10.

In a preferred embodiment, the containment device 10 comprised a cylindrical bag 14 about four feet long and made from a poly nylon reinforced fabric membrane. Preferably, the membrane is from 12 to 80 mil thick. The bag opening 22 was the full cross-section of the interior space 26 and had a draw string 27 at the leading edge 23 of the bag opening 22. The flange strap 28 was proximate the bag opening 22, but set back from the leading edge 23. The portion of the bag opening 22 between the leading edge 23 and the flange strap defined the bag throat 24. In a preferred embodiment, the device had support bands on two foot centers along its axial length that served as expansion means 44. In the cylindrical bag embodiments, each support band 44 had at least one pair of metal rings off set at 45 degrees from what would be the top of the interior space 26. The metal rings served as the attachment means 30 for the containment device 10. Additionally, there can be an optional overflow drain 70 disposed about 45 to 60 degrees radially from the drain port 36. The overflow drain serves as a backup or secondary drain if the effluent level in the interior space 26 of the bag 14 becomes too high.

In using the device 10, the bag throat 24 was passed over the flange 64 at the open end 62 of the vessel 60. The flange strap 28 was tightened to closely engage the bag throat 24 around the flange 64 and seal the interior space 26 of the containment bag 14 to the vessel 60. The draw string 27 at the leading edge 23 of the bag opening 22 was also tightened to closely engage the leading edge 23 of the bag throat 24 with the vessel 60, to provide a secondary seal. If desired, a secondary drain (not shown) may be disposed in the opening throat 24 of the containment bag 14 to drain any effluent that may leak past the primary seal at the flange strap 28.

While the above description contains many specifics, these should not be construed as limitations on the scope of the invention, but rather as exemplifications of one or another preferred embodiment thereof. Many other variations are possible, which would be obvious to one skilled in the art. Accordingly, the scope of the invention should be determined by the scope of the appended claims and their equivalents, and not just by the embodiments.

What is claimed is:

1. A blasting fluid effluent containment device, comprising:
    a containment bag, including:
        a wall enclosing an interior space, and
        a throat having a leading edge defining a circular opening to accommodate an open end of a vessel;
    a flange strap to secure the throat to the vessel and seal the interior space;
    at least one support band, encircling the interior space, to support the containment bag in an expanded condition;
    at least one attachment point, connected to the support band, to suspend the containment bag; and
    a drain port.

2. The containment device of claim 1, further comprising a vent.

3. The containment device of claim 1, further comprising an overflow drain.

4. The containment device of claim 1, further comprising a draw string disposed at the leading edge of the throat.

5. The containment device of claim 1, wherein the containment bag is suspended in a horizontal orientation.

6. The containment device of claim 5, wherein said attachment point includes a pair of metal rings.

7. The containment device of claim 1, wherein the containment bag is made of flexible material and is water impermeable.

8. The containment device of claim 7, wherein the containment bag is a reinforced rubberized material.

9. The containment device of claim 7, wherein the containment bag is a poly nylon reinforced fabric membrane.

10. The containment device of claim 1, wherein the containment bag is substantially cylindrical.

11. The containment device of claim 10, wherein the circular opening is smaller than the cross-section of the interior space.

12. The containment device of claim 10, wherein the throat is removably-attached to the wall.

13. The containment device of claim 10, the wall is between 12 mils to 80 mils thick.

14. The containment device of claim 1, wherein the interior space has a substantially triangular cross-section.

15. The containment device of claim 2, wherein the vent is closable.

16. A method for containing blasting fluid effluent from a vessel using a containment device that includes a containment bag, a flange strap, at least one support band, at least one attachment point connected to the support band, and a drain port, the containment bag including a wall enclosing an interior space and a throat having a leading edge defining a circular opening to accommodate an open end of the vessel, the support band encircling the interior space, the method comprising:
    passing the throat over a flange of the open end of the vessel;
    tightening the flange strap to closely engage the throat around the flange and to seal the interior space to the vessel;
    suspending the containment bag using the attachment point;
    receiving the blasting fluid effluent; and
    emptying the blasting fluid effluent from the interior space.

17. The method of claim 16, wherein the containment bag includes a draw string and the method further comprises tightening the draw string to closely engage the leading edge around the vessel.

18. The method of claim 16, wherein the containment bag is suspended in a horizontal orientation.

19. A blasting fluid effluent containment device, comprising:
    a substantially cylindrical containment bag, including:
        a wall enclosing an interior space, and
        a throat, removably attached to the wall, having a leading edge defining a circular opening to accommodate an open end of a vessel;
    a flange strap to secure the throat to the vessel and seal the interior space;
    at least one attachment point to suspend the containment bag in a horizontal orientation; and
    a drain port.

* * * * *